(12) United States Patent
Saito et al.

(10) Patent No.: US 6,454,677 B2
(45) Date of Patent: Sep. 24, 2002

(54) CONTROL SYSTEM FOR VEHICULAR AUTOMATIC TRANSMISSION

(75) Inventors: Yoshiharu Saito; Kazumi Takagi; Norio Nakauchi; Shirou Godai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/843,867

(22) Filed: Apr. 30, 2001

(30) Foreign Application Priority Data

May 25, 2000 (JP) ........................................ 2000-155251

(51) Int. Cl.[7] ............................................. B60K 41/20
(52) U.S. Cl. ......................................................... 477/93
(58) Field of Search ............................................. 477/93

(56) References Cited

FOREIGN PATENT DOCUMENTS

| JP | 11-193866 | 7/1999 |
|---|---|---|
| JP | 11-230329 | 8/1999 |

*Primary Examiner*—Dirk Wright
(74) *Attorney, Agent, or Firm*—Armstrong, Westerman & Hattori, LLP

(57) ABSTRACT

A control system, which creates a neutral condition if a vehicle is stationary with the brake of the vehicle being actuated and the accelerator for the engine being turned off while the transmission is set in a drive range, is equipped with a brake switch (36), which detects the operational condition of the brake, and a output rotation sensor (40), which detects the rotational speed of the output member of the transmission. If the control system detects the rotation of the output member by the output rotation sensor (40), then the control system terminates the neutral condition in spite of the operational condition of the brake, which is detected by the brake switch (36).

9 Claims, 7 Drawing Sheets

CONTROL SYSTEM FOR VEHICULAR AUTOMATIC TRANSMISSION

FIELD OF THE INVENTION

The present invention relates to a vehicular automatic transmission (including a continuously variable transmission) which is constructed to perform an automatic control for establishing speed change ratios in response to changes in the driving condition while the driver manipulates the shift lever to select drive ranges.

BACKGROUND OF THE INVENTION

A vehicular automatic transmission comprises a speed change mechanism which includes a plurality of mechanical power transmission paths and is connected to an engine through, for example, a torque converter. Selection of or switching to an appropriate power transmission path, i.e., an appropriate speed change ratio, is automatically performed on the basis of, for example, the accelerator opening and the vehicle speed. Generally, a vehicle with an automatic transmission is equipped with a shift lever, which is operated by a driver. When the driver manipulates the shift lever, a range of speed change ratios or a drive range (for example, a reverse drive range, a neutral range, a forward drive range) is selected in response to the manipulation of the shift lever, and the speed change ratio is automatically adjusted or controlled within the selected drive range (usually in a forward drive range).

When a vehicle equipped with such an automatic transmission is stopped while the transmission is set in the forward drive range, a so-called creeping phenomenon occurs because the driving force from the engine which is idling is transmitted to the transmission through the torque converter and then to the wheels. This creeping phenomenon is beneficial for smooth starting under a certain condition, for example, when the vehicle stops and then starts on an upward slope, but not welcome when the vehicle should be kept stationary. At present, to keep the vehicle stationary, the brake must be operated against the creeping force, which is generated by the engine, so this brake operation reduces the mileage allowance or the fuel efficiency of the vehicle.

To solve this problem, a method to improve the fuel efficiency of such an automatic transmission is proposed. In this method, while the vehicle is kept stationary with the brake pedal being stepped or pressed for brake operation and the accelerator being substantially closed, the transmission is set into a neutral condition although the selection of the drive range is kept unchanged (for example, Japanese Laid-Open Patent Publication Nos. H11-193866, H11-230329, etc.).

In such a transmission which is set in a neutral condition while the brake pedal is pressed for keeping the vehicle stationary, the brake operation is monitored by a brake switch which is turned on while the brake pedal is pressed by the driver. More specifically, the brake switch turns on at the beginning of the brake actuation. However, the response of the brake switch is somewhat delayed when the brake pedal is released because a certain distance in the operational stroke of the brake pedal, which distance depends on how deep the pedal is pressed, must be cleared before the brake switch is actually turned off.

This characteristic property of the brake switch presents a following problem. After the vehicle has come into a halt with the brake pedal being pressed while the transmission is set in a drive range, if the brake pedal is released gradually or the brake pedal is released and kept half way in the operational stroke, then there is a possibility that while the brake operation itself terminates, the brake switch is kept being turned on. If this condition occurs, though the transmission itself is in a neutral, the control system detects that the brake is still being actuated. This condition results in a delayed response in the starting control of the vehicle.

SUMMARY OF THE INVENTION

It is an object of the present invention to provide a control system for a vehicular automatic transmission, which system can establish a neutral condition for the transmission set in a forward drive range while the vehicle is stationary with the brake being operated, and which system thereafter enables the vehicle to start smoothly without any control delay when the brake pedal is released for starting the vehicle.

To realize the above objective, the present invention provides a control system (for example, the control valve CV and the electronic control unit ECU described as a preferred embodiment in the following section) for a vehicular automatic transmission (for example, the automatic transmission TM described in the following section, and also a continuously variable transmission). The control system according to the present invention performs an automatic control for selecting and establishing a speed ratio (speed change gear ratio) in response to the condition of the vehicle set in a drive range, and the control system creates a neutral condition if the vehicle is stationary with the brake of the vehicle being actuated and the accelerator for the engine being turned off (i.e., the accelerator pedal is released to turn off the accelerator, but the engine is kept idling) while the transmission is set in the drive range. This control system further comprises a brake operation detector (for example, the brake switch 36 described in the following section), which detects the operational condition of the brake of the vehicle, and an output rotation detector (for example, the output rotation sensor 40 described in the following section), which detects the rotational speed of the output member of the transmission. With this arrangement, the control system terminates the neutral condition and sets a predetermined speed ratio (any of the speed ratios in the drive range) if the rotation of the output member is detected by the output rotation detector, even though the operation of the brake is still detected by the brake operation detector.

According to the present invention, if the operation of the brake is terminated while the transmission is in the neutral condition, then the termination of the actual brake operation is detected accurately by the output rotation detector. For example, when the vehicle is on a bumpy road or on a sloped road, the wheels of the vehicle tend to rotate at least a little. This minute rotation of the wheels can be detected by the output rotation detector, and the control system can control the transmission accordingly and appropriately. In a case where the brake pedal is released gradually or the brake pedal is released and kept half way in the operational stroke (in this case, even though the brake operation detector, i.e., the brake switch, has not detected the release of the brake pedal), the actual termination of the brake operation is detected by the output rotation detector, so the control system immediately shifts the transmission from the neutral condition to a predetermined speed ratio (for example, the LOW speed ratio) in the forward drive range. As a result, there is little delay in the control that terminates the neutral condition and starts the vehicle smoothly.

When the vehicle is on a road which descends forwardly, no control delay is experienced. Therefore, if the control system detects that the vehicle is on a descending road by an inclination sensor (for example, the inclination sensor 37 described in the following section), which detects the inclination of the vehicle in the traveling direction, the control system may maintain the neutral condition even though the output rotation detector detects that the output member is rotating, and the control system may terminate the neutral condition when the brake operation detector detects that the brake is released. In this way, the fuel efficiency of the vehicle is improved by keeping the neutral condition a little longer.

On the other hand, when the vehicle is on an ascending road, the control system should expect a delay in the control for starting the vehicle. Therefore, if the control system detects by the inclination sensor that the vehicle is on an ascending road whose inclination is equal to or greater than a predetermined inclination, then it is preferable that the control system will not allow the transmission to be set in the neutral condition even though the vehicle whose transmission set in the drive range is stationary with the brake being operated and the accelerator being turned off.

For the same reason as described above, the control system may further comprise a first acceleration detector (for example, an arrangement which calculates a first acceleration by the output rotation sensor 40 and the electronic control unit ECU described in the following section), which detects the vehicle's acceleration in the traveling direction on a basis of changes in the speed of the vehicle, a second acceleration detector (for example, an arrangement which calculates a second acceleration by the G sensor 38 and the electronic control unit ECU described in the following section), which detects the vehicle's acceleration in the traveling direction based on a value detected by a G sensor (a sensor which detects directly accelerations acting on the vehicle, such as gravitational acceleration and accelerations at the time of the vehicle's starting and stopping), and an inclination detector (for example, an arrangement which comprises the steps Step S33 and Step S34 described in the following section), which calculates the vehicle's inclination in the traveling direction from the acceleration values detected by the first and second acceleration detectors. With this arrangement, if the vehicle's inclination in the traveling direction detected by the inclination detector just before the vehicle has come into a halt indicates that the inclination is equal to or greater than a predetermined upward inclination, then it is preferable that while the vehicle is stationary with the brake being operated and the accelerator being turned off, the control system will not allow the transmission in the drive range to be set in a neutral condition.

In a case where the inclination of the road is detected from the acceleration of the vehicle as described above, if the vehicle is brought into a halt abruptly, then an error is likely to happen in the detection of the acceleration and in the inclination detection following the acceleration detection. To solve this problem, the control system further comprises a deceleration detector (for example, the G sensor 38 described in the following section), which detects the vehicle's deceleration while the vehicle is traveling. With this arrangement, if the vehicle's deceleration detected by the deceleration detector just before the vehicle has come into a halt is equal to or greater than a predetermined deceleration, then it is preferable that while the vehicle is stationary with the brake being operated and the accelerator being turned off, the control system will not allow the transmission in the drive range to be set in a neutral condition notwithstanding a value detected by the inclination detector.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus are not limitative of the present invention and wherein.

DESCRIPTION OF THE PREFERRED EMBODIMENTS

Figure 1:
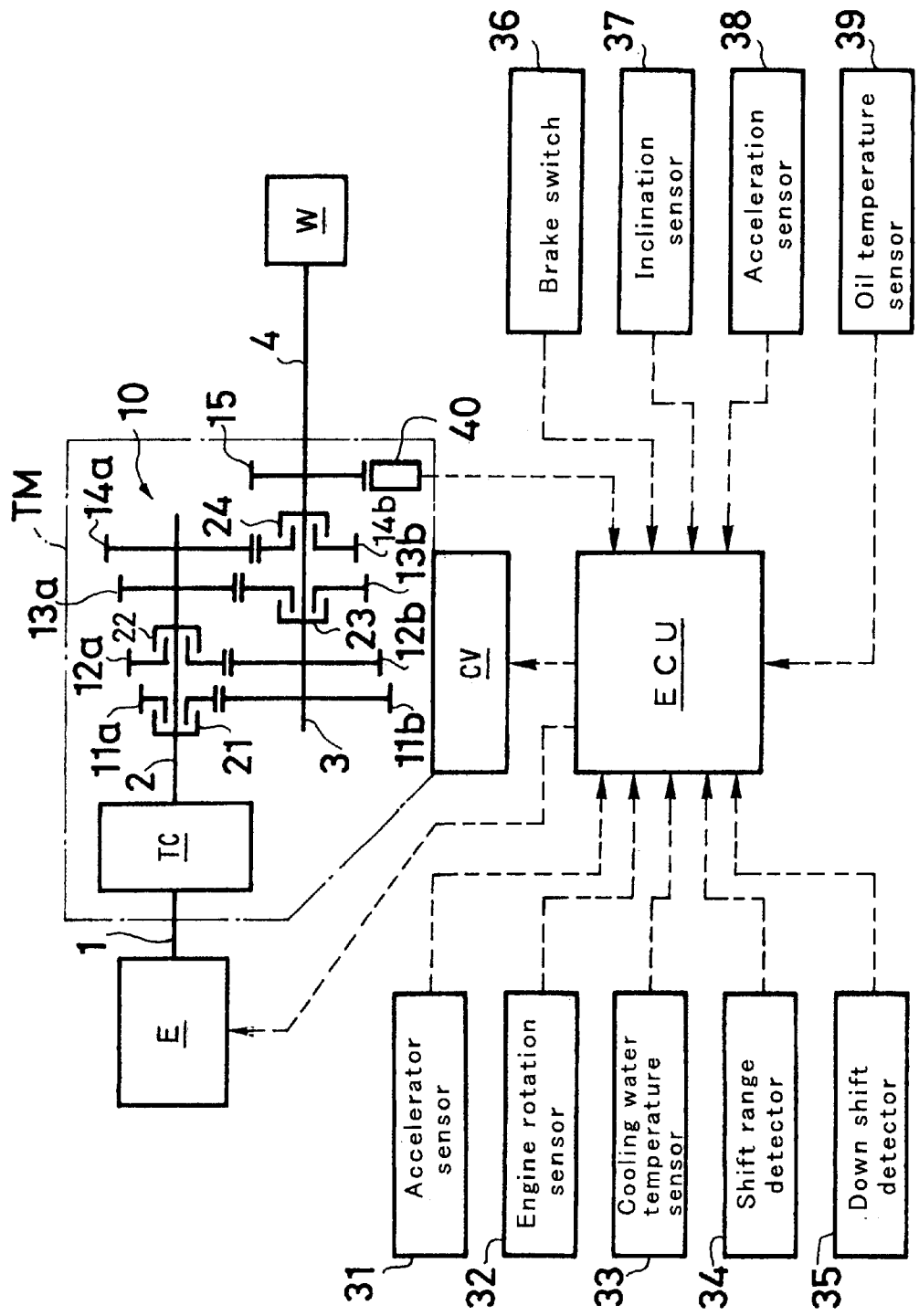
FIG. 1 is a schematic diagram which shows power transmission paths and a control system of a vehicular automatic transmission according to the present invention.

Referring to the drawings, a preferred embodiment according to the present invention is described. FIG. 1 shows the power transmission paths of a vehicular automatic transmission and the construction of a control system which is designed for this transmission according to the present invention. This automatic transmission TM comprises a torque converter TC, which is connected to the output shaft 1 of an engine E, a parallel shaft speed change mechanism 10, which includes a transmission input shaft 2 connected to the turbine of the torque converter TC, and a control valve CV, which is used for controlling the clutch engagement of the parallel shaft speed change mechanism 10 for automatic speed ratio change.

The parallel shaft speed change mechanism 10 includes a transmission input shaft 2 and a transmission output shaft 3, which are disposed freely rotatable and in parallel with each other, four gear trains (namely, LOW gear train 11a and 11b, SECOND speed gear train 12a and 12b, THIRD speed gear train 13a and 13b, and FOURTH speed gear train 14a and 14b), which are disposed between the input and output shafts 2 and 3, and a plurality of clutches (namely, LOW clutch 21, SECOND clutch 22, THIRD clutch 23 and FOURTH clutch 24), each of which selectively engages a corresponding gear train for power transmission. As the output shaft 3 is connected through a drive shaft 4 to the wheels W, the output of the engine E is transmitted through the torque converter TC to the transmission input shaft 2 and then through a gear train which is selected through an appropriate clutch engagement carried out by the control system to the transmission output shaft 3. This driving force is then transmitted through the drive shaft 4 to the wheels W, which carry and move the vehicle forward or rearward, respectively.

On the transmission output shaft 3 (or on the drive shaft 4, which is connected with the output shaft 3), a rotation detection gear 15 is provided, and an output rotation sensor 40 is provided opposite to this rotation detection gear 15. This output rotation sensor 40 is capable of detecting a minute amount of rotation of the transmission output shaft 3, and it is made of, for example, a magnetoresistant element, which is generally known as a semiconductor sensor.

The shift of this automatic transmission TM is executed by selectively engaging one of the clutches, i.e., the LOW clutch 21, the SECOND clutch 22, the THIRD clutch 23 and the FOURTH clutch 24, through the actuation of the control valve CV, which is controlled automatically by an electronic control unit ECU in response to the drive range selected by the manipulation of the shift lever, the accelerator opening of the engine E, the speed of the vehicle, etc. The drive ranges to be established are a parking range, a reverse drive range, a neutral range, and a forward drive range, and the automatic shift control is performed while the transmission is set in the forward drive range.

At first, the automatic shift control performed by the electronic control unit ECU is described in reference to FIG. 1. The electronic control unit ECU receives signals from an accelerator sensor 31, which detects the accelerator opening of the engine E, from an engine rotation sensor 32, which detects the rotation of the engine, a cooling water temperature sensor 33, which detects the temperature of the engine cooling water, from a shift range detector 34, which detects the drive range selected by the shift lever, from a downshift detector 35, which detects a downshift (especially to the THIRD, SECOND or FIRST speed), from a brake switch 36, which detects the downward movement of the brake pedal, from an inclination sensor 37, which detects the inclination of the vehicle in the traveling direction, from an acceleration sensor 38, which detects the acceleration G of the vehicle in the traveling direction, and from a T/M oil temperature sensor 39, which detects the temperature of the hydraulic oil of the transmission. The electronic control unit ECU controls the actuation of the control valve CV in correspondence to these detection signals and performs the automatic shift control.

Figure 2:
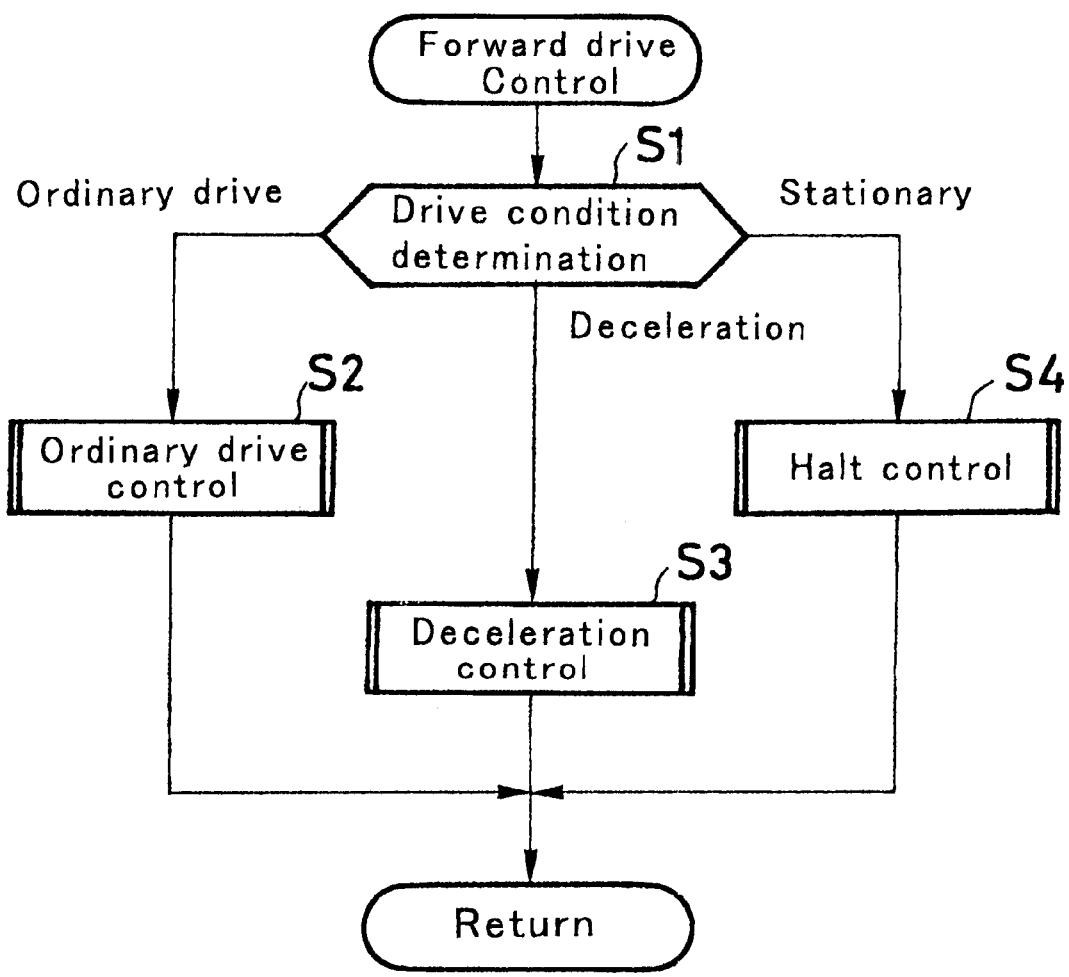
FIG. 2 is a flowchart which describes an automatic shift control routine executed for a forward drive range established in the above automatic transmission.

Now, in reference to FIG. 2, a description is made of an automatic shift control which is executed by the electronic control unit ECU when the forward drive range is selected as a shift range. As shown in the flowchart of FIG. 2, the control of the vehicle traveling in the forward drive range is executed as follows. At first, the condition of the vehicle is determined at Step S1. If the vehicle is in a normal driving condition, then the control flow proceeds to Step S2, where an ordinary drive control is executed. On the other hand, if it is in a deceleration, then the control flow proceeds to Step S3, where a deceleration control is executed. However, if the condition is that the vehicle is stationary, then a halt control is executed at Step S4. The ordinary drive control is an automatic shift control which drives the vehicle in correspondence to the accelerator opening and the vehicle speed. The ordinary drive control is not directly related to the present invention, and such controls are well known in the art, so no further description is made in this respect.

Figure 3:
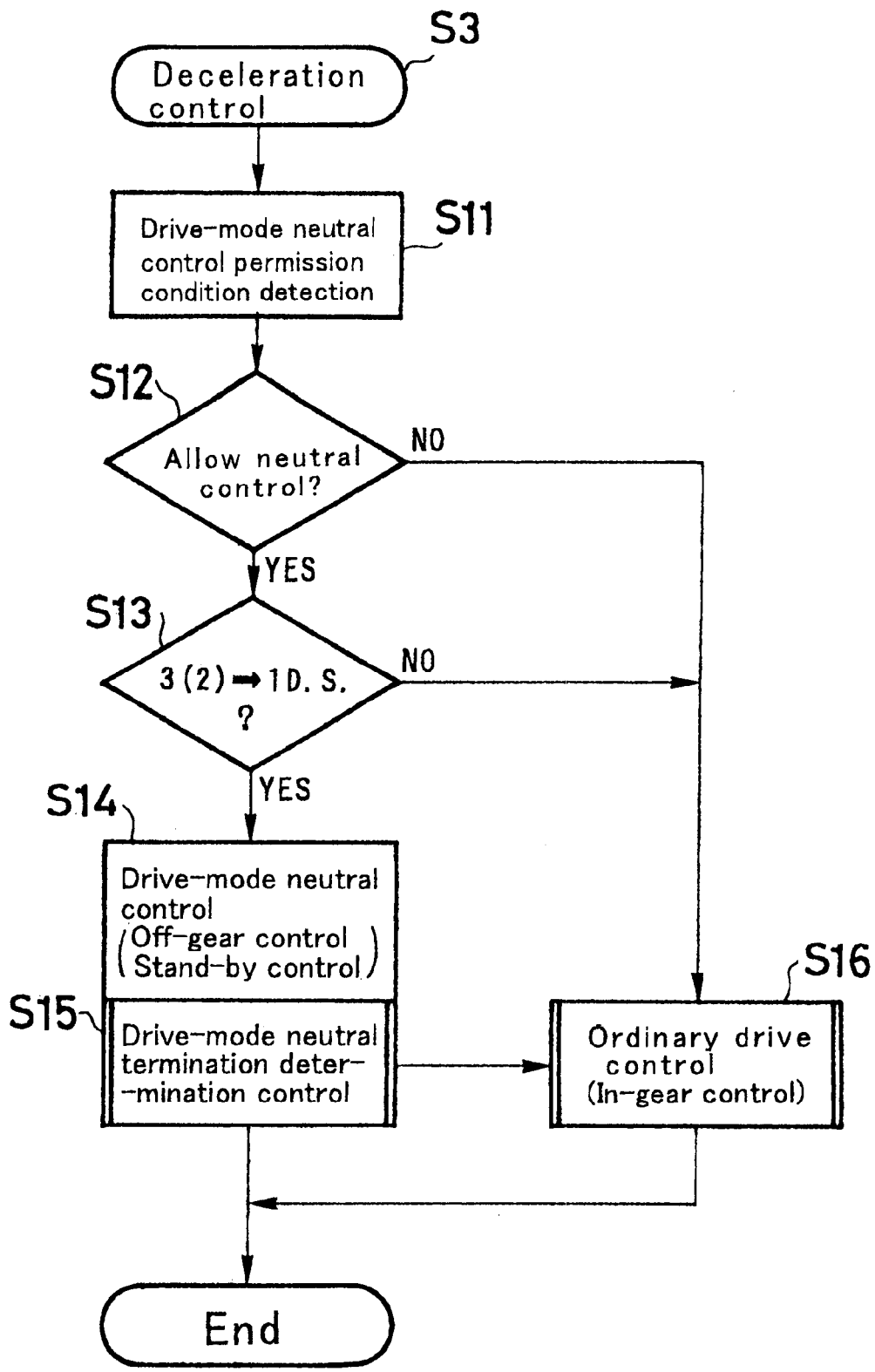
FIG. 3 is a flowchart which describes a deceleration control routine, which is a part of the automatic shift control executed for the forward drive range.

FIG. 3 shows a routine for the deceleration control which is executed at Step S3. This control is executed while the vehicle is traveling and when the accelerator pedal is released to make the accelerator close substantially for deceleration. At first, at Step S11, a detection is made to determine whether conditions necessary for allowing a drive-mode neutral control are satisfied or not. In the deceleration control, the speed change mechanism is set in a neutral condition while the shift range of the transmission is maintained to the forward drive range if the condition is satisfied at a certain phase (for example, the vehicle speed is reduced to about 11 km/h, and the speed ratio is downshifted to the LOW) before the vehicle comes into a halt. This is done for fuel efficiency improvement.

More specifically, the followings are the determinants for allowing the drive-mode neutral control, which are detected at Step S11: the shift range detected by the shift range detector 34 is a "D4" range; the vehicle speed is relatively low (for example, equal to or lower than 11 km/h); the hydraulic oil temperature of the transmission detected by the T/M oil temperature sensor 39 is equal to or higher than a predetermined temperature; the cooling water temperature of the engine detected by the cooling water temperature sensor 33 is equal to or higher than a predetermined temperature; the accelerator opening detected by the accelerator sensor 31 is substantially closed; and the brake switch 36 is turned on, detecting the actuation of the brake.

It is clear from the above predetermined conditions that if the shift range is not in the "D4" range but in another forward drive range, for example, a "2" range or a "1" range, which is intended to maintain the transmission in a speed ratio for a lower vehicle speed, then the transmission is not allowed to be set into a neutral condition. The reason is that if the shift range is set in a range other than the "D4" range, it is considered that the driver intends to effect an engine brake. In this case, the transmission is not allowed to be set into a neutral condition until the vehicle speed becomes substantially low. Also, if the hydraulic oil temperature of the transmission and the cooling water temperature of the engine are lower than the predetermined values, then the transmission is not allowed to be set into a neutral condition. Furthermore, if the accelerator pedal is being pressed, or if the brake pedal is released, then the transmission is not allowed to be set into a neutral condition because such conditions are considered as a prelude for the transmission to return into an ordinary traveling mode.

At Step S12, a determination is made whether the above conditions for the execution of the drive-mode neutral control are satisfied or not. If all the conditions are satisfied, then the control flow proceeds to Step S13, where a determination is made whether a command for a downshift from the THIRD speed (or the SECOND speed) to the FIRST speed (the LOW speed) has been generated or not. As long as all the conditions are met, and a command for such a downshift is not generated, the control flow proceeds to Step S16, where the ordinary drive control (the control executed at Step S2 in FIG. 2) is executed. On the other hand, if such a downshift command is generated, the control flow proceeds to Step S14, where the transmission is set into a neutral condition (referred to as "drive-mode neutral control"). In other words, when the vehicle speed becomes low and a command for a downshift to the FIRST speed is generated, a control to set the transmission into a neutral condition is started. In this way, the transition of the control modes of the transmission is carried out smoothly.

The drive-mode neutral control executed at Step S14 comprises an off-gear control and a stand-by control. The off-gear control reduces the hydraulic pressure of the THIRD speed clutch 23 (or the SECOND speed clutch 22)

to a predetermined pressure and starts supplying a hydraulic pressure to the LOW clutch 21, and the stand-by control releases the hydraulic pressure of the THIRD speed clutch 23 (or the SECOND speed clutch 22) but maintain the hydraulic pressure of the LOW clutch 21 at a stand-by pressure, following the off-gear control. The stand-by pressure is the pressure that maintains the LOW clutch 21 in a condition where the clutch is positioned very close to the point of engagement. Therefore, in this condition, if the hydraulic pressure of the LOW clutch 21 is increased a little, then the LOW clutch 21 can immediately start engaging. Such is the neutral condition of the LOW clutch 21 in the stand-by control.

While the drive-mode neutral control is executed in this way, in parallel with this control, a drive-mode neutral termination determination control is executed. In the drive-mode neutral termination determination control, a judgment is made whether to terminate the drive-mode neutral control or not, and if the judgment is to terminate the drive-mode neutral control, then the drive-mode neutral control is terminated.

Figure 4:
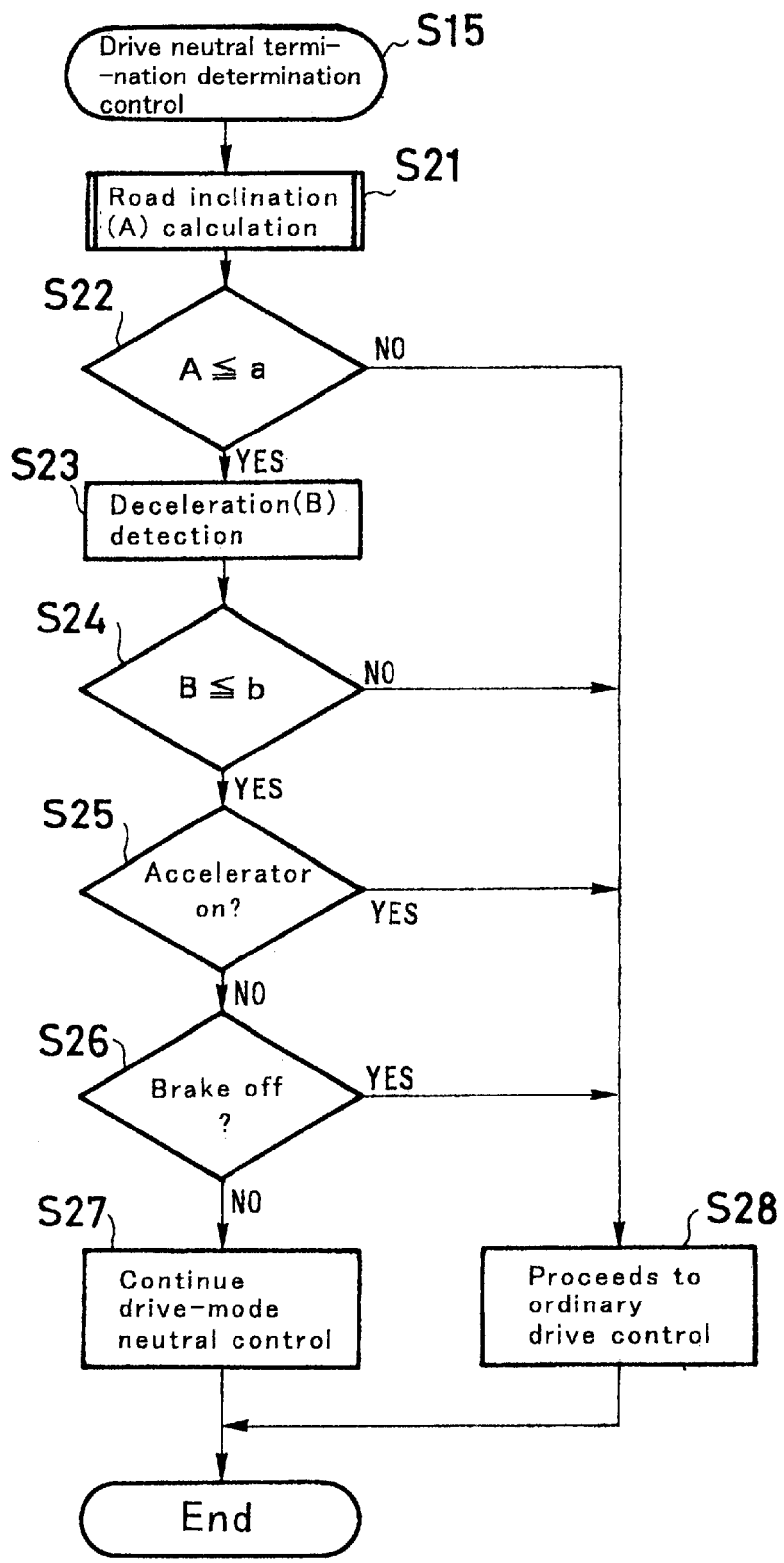
FIG. 4 is a flowchart which describes a drive-mode neutral termination control routine, which is a part of the deceleration control.
Figure 5:
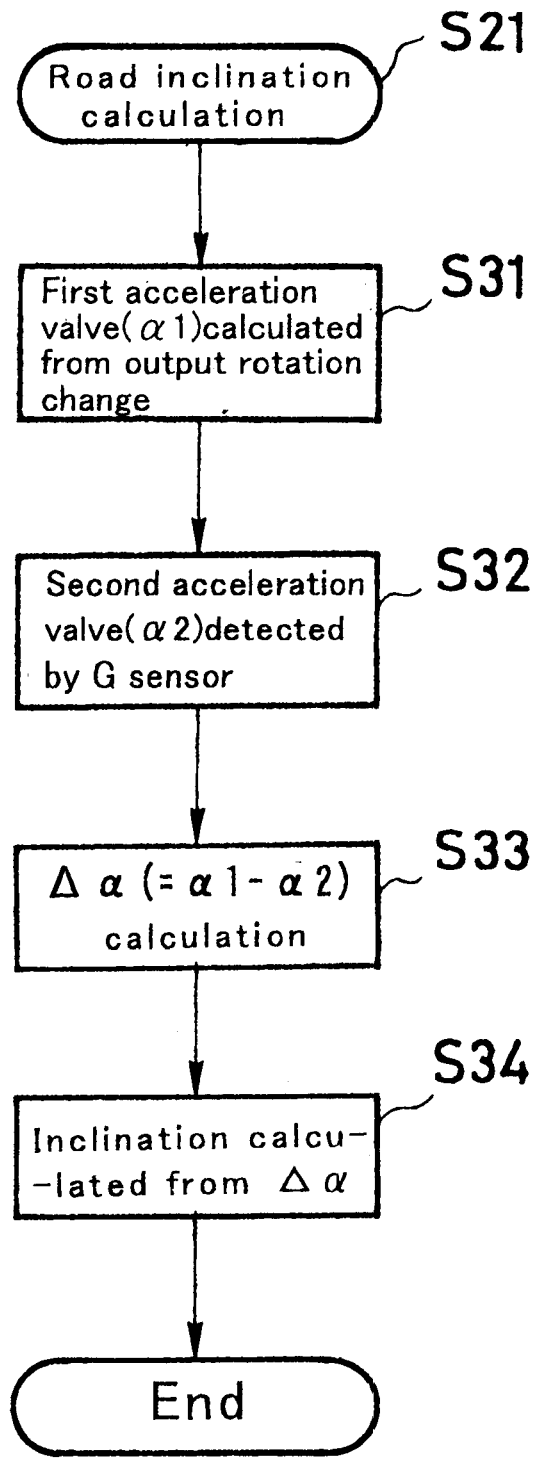
FIG. 5 is a flowchart which describes road inclination calculation steps, which are executed in the drive-mode neutral termination control.

FIG. 4 shows this termination determination control. In this control, the inclination (A) of the road on which the vehicle is traveling is calculated at Step S21. A routine for this road inclination calculation, which is shown in FIG. 5, is described in detail at first. In this calculation, at first, the acceleration of the vehicle in the traveling direction is calculated from the change of the output rotation of the transmission detected by the output rotation sensor 40 (or from the change of the vehicle speed) at Step S31 (the value calculated here is referred to as "first acceleration $\alpha 1$"). Then, the acceleration of the vehicle in the traveling direction is detected by the acceleration sensor 38 at Step S32 (this value detected here is referred to as "second acceleration $\alpha 2$"). After that, the difference between the first acceleration value and the second acceleration value is calculated at Step S33 ($\Delta\alpha=(\alpha 1-\alpha 2)$).

Here, the first acceleration $\alpha 1$ is the acceleration of the vehicle in the traveling direction calculated from the rate of change of the vehicle speed while the second acceleration $\alpha 2$ is the value detected by the acceleration sensor (G sensor) 38, which is affected by the gravitational acceleration. The acceleration sensor 38 is arranged or adjusted to detect the acceleration in the traveling direction of the vehicle while the vehicle is traveling on a horizontal ground so that the detection will not be affected by the gravitational acceleration. For example, if the vehicle is inclined on a slope in the traveling direction, then a component of the gravitational acceleration that corresponds to this inclination is included in the detected value. Therefore, the above calculated difference ($\Delta\alpha=(\alpha 1-\alpha 2)$) is caused by this component of the gravitational acceleration, which corresponds to the inclination of the vehicle. Thus, the inclination of the vehicle at the moment, i.e., the inclination (A) of the road on which the vehicle is traveling at the time, is calculated from the difference $\Delta\alpha$ at Step S34.

Now, returning to FIG. 4, after the road inclination (A) is calculated at Step S21, the control flow proceeds to Step S22, where a determination is made whether or not this calculated road inclination (A) is equal to or smaller than a predetermined inclination (a) (for example, 2 degrees for an upward slope). FIG. 10 shows this determinant. If the upward slope has a road inclination (A) which is larger than the predetermined inclination (a) (a=2 degrees), then the control flow proceeds to Step S28, where the ordinary drive control is executed. This is because if the vehicle is stopped with the transmission set in the above described neutral condition on such an upward slope, then the vehicle may recede when it is to be started. On the other hand, if the calculated road inclination (A) is equal to or smaller than a predetermined inclination (a), i.e., $A \leq a$, in other words, if the vehicle is traveling on a road which is sloped not very much upward or downward or which is substantially flat, then the control flow proceeds to Step S23, where the deceleration (B) of the vehicle at the moment is detected. Then, at Step S24, a determination is made whether or not this deceleration (B) is equal to or smaller than a predetermined deceleration (b) (for example, 0.3G). If the detected deceleration (B) is greater than the predetermined value (in this example, B>0.3G), then the control flow proceeds to Step S28, where the ordinary drive control is executed. The reason is that when the deceleration (B) is greater than the predetermined value (b), the calculation of the road inclination performed at Step S21 tends to become inaccurate. To circumvent this problem, the ordinary drive control is executed instead.

On the other hand, if the deceleration (B) is equal to or smaller than the predetermined value (b), i.e., $B \leq b$, then the control flow proceeds to Step S25, where a determination is made whether the accelerator is turned on or not (i.e., if the accelerator pedal is pressed or not). Then, at Step S26, a determination is made whether the brake pedal is turned off or not (i.e., if the brake pedal is released and the brake switch 36 is turned off or not). If the accelerator is turned on, or the brake is turned off, then such a condition is taken as an indication that the driver intends to keep driving. Therefore, the control flow proceeds to Step S28, where the ordinary drive control is executed. On the other hand, if the accelerator is turned off (i.e., substantially closed) and the brake is turned on, then the drive-mode neutral control is continued.

Figure 6:
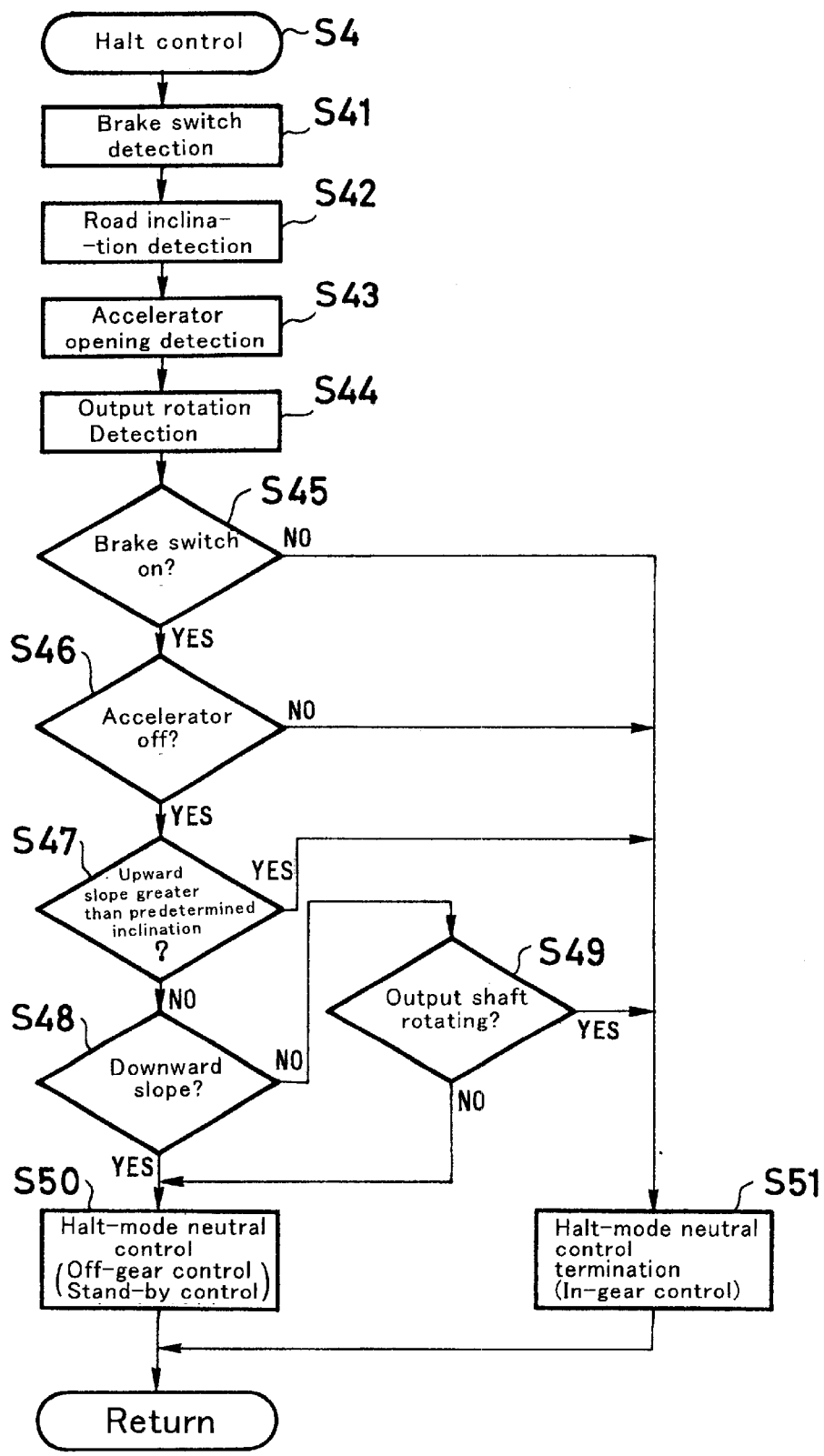
FIG. 6 is a flowchart which describes a vehicle halt control routine, which is a part of the automatic shift control executed for the forward drive range.

Now, the halt control executed at Step S4 is described in detail in reference to FIG. 6. This control is to be executed when the vehicle is stationary with the transmission set in the forward drive range. For example, it can be executed to control the vehicle which has come into a halt after the execution of the drive-mode neutral control at Step S3, which is described above.

In the halt control, the condition of the brake switch 36, i.e., whether the brake switch 36 is on or off, is detected at Step S41, and then, the inclination of the road in the traveling direction where the vehicle is stationary (i.e., in the front and rear direction of the vehicle) is detected at Step S42. This detection of the road inclination is carried out by the inclination sensor 37, which is provided in the vehicle. However, while the vehicle was decelerating before coming into a halt, the inclination of the road was already calculated at Step S21 of the drive-mode neutral termination determination control (Step S15) shown in FIG. 4. This inclination calculated just before the vehicle has come into the halt may be used as the present road inclination, instead. Then, at Step S43, the accelerator opening of the engine E is detected by the accelerator sensor 31, and the rotation of the output member (i.e., the transmission output shaft 3 or the drive shaft 4), i.e., the rotation of the wheels W, is detected by the output rotation sensor 40 at Step S44.

Then, at Step S45, a determination is made whether the brake switch 36 is on or not. If the brake switch 36 is off, then it is considered that the driver intends to start the vehicle. In this case, the control flow proceeds to Step S51, where the halt-mode neutral control is not executed, or the neutral control is terminated, and an in-gear control (the initialization of the starting clutch, for example, the LOW clutch 21) is started. If the brake switch 36 is on, then the control flow proceeds to Step S46, where another determination is made whether the accelerator is off or not. If the accelerator is on, then it is considered that the driver intends to start the vehicle. Therefore, the control flow proceeds to Step S51, where the halt-mode neutral control is terminated, and/or the in-gear control (the initialization of the starting clutch, for example, the LOW clutch 21) is started.

Figure 7:
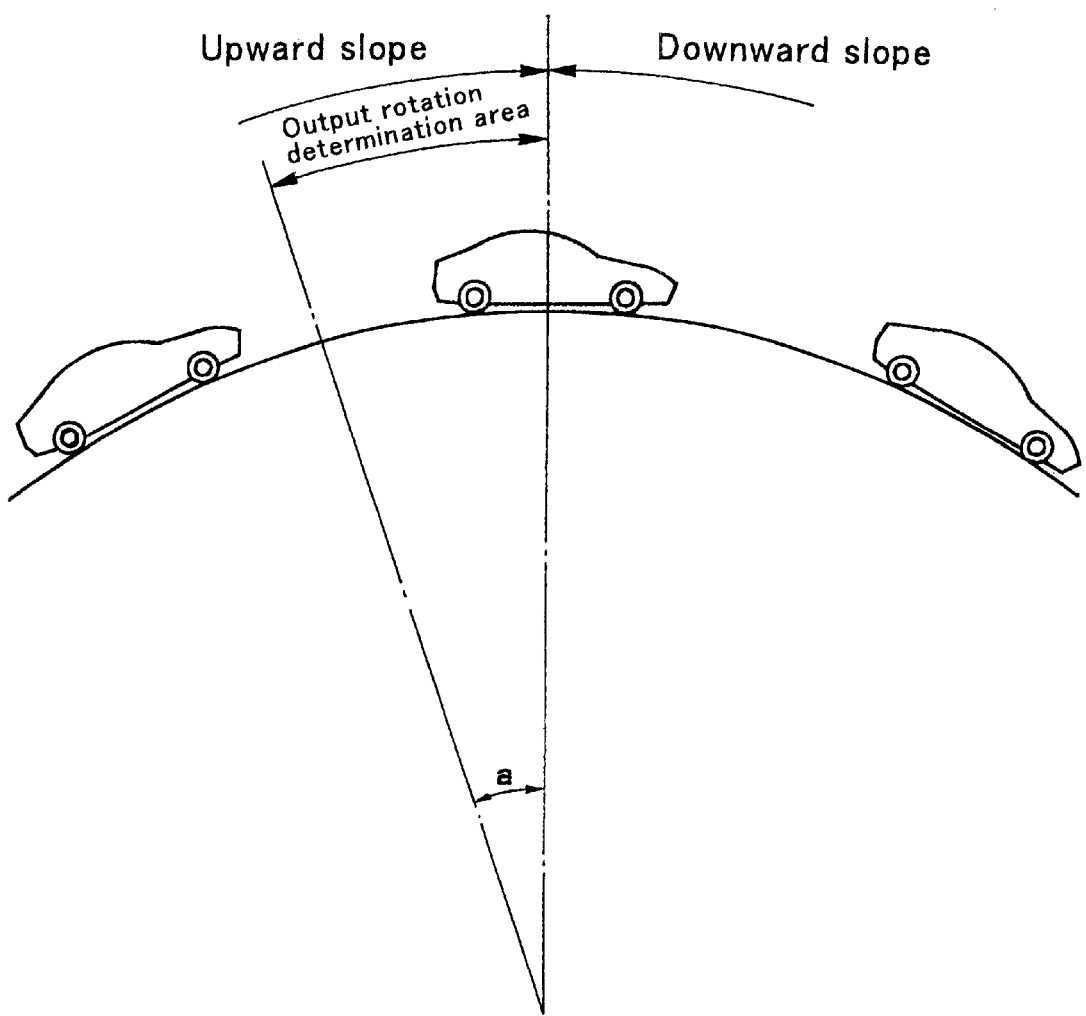
FIG. 7 is an illustration which shows the inclination of the road to be calculated in the above mentioned road inclination calculation.

On the other hand, if the accelerator is off, then the control flow proceeds to Step S47, where a determination is made whether or not the road on which the vehicle is stationary is sloped upward with an inclination that is equal to or greater than the predetermined inclination (a). This determination is executed in the same way as Step S22 in FIG. 4, and whether or not the road inclination (A) is equal to or greater than the predetermined inclination (a) (refer to FIG. 7) is determined. If the result of the determination at Step S47 is that the road inclination is equal to or greater than the predetermined inclination (A≧a), then the control flow proceeds to Step S51, where the halt-mode neutral control is terminated, and/or the in-gear control (the initialization of the starting clutch, for example, the LOW clutch 21) is started.

If the road inclination is smaller than the predetermined inclination (A<a), then the control flow proceeds to Step S48, where a determination is made whether the road on which the vehicle is stationary is sloped downward or not. If the road is sloped downward, then there is no possibility that the vehicle should experience a starting delay. Therefore, the control flow proceeds to Step S50, where the halt-mode neutral control is executed to set the transmission into a neutral condition. As described previously, the halt-mode neutral control comprises an off-gear control and a stand-by control. The off-gear control reduces the hydraulic pressure of the THIRD speed clutch 23 (or the SECOND speed clutch 22) to a predetermined pressure and starts supplying a hydraulic pressure to the LOW clutch 21, and the stand-by control releases the hydraulic pressure of the THIRD speed clutch 23 (or the SECOND speed clutch 22) but maintain the hydraulic pressure of the LOW clutch 21 at a stand-by pressure, following the off-gear control. Here, the road inclination downward is detected if it is equal to or greater than a predetermined inclination, which is set to zero or to a few degrees.

On the other hand, if the road is determined to have an upward slope at Step S48, i.e., if the upward inclination of the road is determined to be within the predetermined inclination (a) (in the output rotation determination area shown in FIG. 7), then the control flow proceeds to Step S49, where another determination is made whether or not any output rotation is detected by the output rotation sensor 40. If the output member, for example, the transmission output shaft 3, is determined to be rotating even a little, then the control flow proceeds to Step S51, where the halt-mode neutral control is terminated, and/or the in-gear control (the initialization of the starting clutch, for example, the LOW clutch 21) may be started. On the other hand, if there is no output rotation, then the control flow proceeds to Step S50, where the halt-mode neutral control is continued.

As described above, a basic control (halt-mode neutral control) is to set the transmission into a neutral condition if the brake is on and the accelerator is off after the vehicle has come into a halt with the transmission in the forward drive range. However, if the road on which the vehicle has stopped is sloped upward with an inclination equal to or greater than a predetermined inclination (a), then the halt-mode neutral control is not executed. Also, the halt-mode neutral control is terminated when the brake is turned off. However, in this case, in consideration of the fact that there is a delay between the actual turning off of the brake operation and the turning off of the brake switch 36, the system is arranged such that even though the brake switch 36 is not yet turned off, if the output member of the transmission rotates even a little, the halt-mode neutral control is terminated to avoid a delay in the starting of the vehicle. Also, for a descending road whose inclination is relatively small, the system may be arranged to terminate the halt-mode neutral control when the output member starts rotating.

For the above described control, the inclination sensor 37, the acceleration sensor 38, the output rotation sensor 40, etc. are important. If any of the sensors experiences a failure, then the control will become unstable and unreliable. To circumvent this problem, the control system monitors these sensors, and if any failure is detected, then the control system will not execute the drive-mode neutral control and the halt-mode neutral control.

Furthermore, according to the present invention, the transmission which is set in the above described neutral condition within a drive range while the vehicle is stationary with the brake on and the accelerator off (while the engine is idling) can be then controlled in the following way. The control system according to the present invention detects the actual termination of the brake operation by a rotation detector even in such a condition that the brake pedal is released gradually or the brake pedal is released and kept half way in the operational stroke (even though the brake operation detector, i.e., the brake switch 36, has not detected the release of the brake pedal). In response to the detection of the termination of the brake operation, the control system immediately shifts the transmission from the neutral condition to a speed ratio (for example, the LOW speed ratio) in the drive range to start the vehicle smoothly without any control delay.

If the road is descending forwardly, there is little delay in the starting control of the vehicle. Therefore, if the control system detects that the vehicle is on a descending road, then the control system preferably terminates the neutral condition to start the vehicle, not immediately after the rotation of the output member of the transmission is detected by the rotation detector, but after the termination of the brake operation is detected by the brake operation detector. In this way, the fuel efficiency of the vehicle can be improved because the neutral condition is kept relatively longer.

On the other hand, if the road is ascending forwardly, i.e., if the control system detects that the vehicle is on an upward slope with an inclination that is equal to or greater than a predetermined angle, then the control system preferably will not allow the transmission to be set in a neutral condition even though the vehicle is stationary with the brake being operated and the accelerator being turned off while the transmission is in the drive range.

Also, the control system according to the present invention may be equipped with a first acceleration detector, which detects the acceleration of the vehicle in the traveling direction from the change of the vehicle speed, a second acceleration detector, which detects the acceleration of the vehicle from the value detected by the G sensor, and an inclination detector, which calculates the inclination of the vehicle in the traveling direction from the values detected by the first and second acceleration detectors. With this arrangement, if the inclination of the vehicle in the traveling direction detected by the inclination detector just before the vehicle has come into a halt indicates that the inclination is equal to or greater than a predetermined upward inclination, then the control system will not establish a neutral condition for the transmission which is set in a drive range while the vehicle is stationary with the brake being operated and the accelerator being turned off.

In a case where the inclination of the road is detected from the acceleration of the vehicle as described above, if the vehicle is brought into a halt abruptly, then an error is likely to happen in the detection of the acceleration. To circumvent this problem, if the deceleration of the vehicle detected by a deceleration detector just before the vehicle has come into a halt is equal to or greater than a predetermined deceleration, then it is preferable that the control system will not allow the transmission to be set in a neutral condition, though the transmission is set in a drive range while the vehicle is stationary with the brake being operated and the accelerator being turned off.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2000-155251 filed on May 25, 2000, which is incorporated herein by reference.

What is claimed is:

1. A control system for a vehicular automatic transmission whose operation is automatically controlled for selecting and establishing a speed ratio from a plurality of speed ratios in response to condition of a vehicle set in a drive range, said control system creating a neutral condition if said vehicle is stationary with a brake being operated and an accelerator for an engine being turned off while said transmission is set in said drive range;
wherein:
said control system comprises a brake operation detector, which detects operational condition of said brake of said vehicle, and an output rotation detector, which detects rotational speed of an output member of said transmission; and
even though said brake operation detector detects that said brake is being operated, if said output rotation detector detects that said output member is rotating, then said control system terminates said neutral condition and sets a predetermined speed ratio.

2. The control system as set forth in claim 1, wherein:
if said drive range is selected as a drive range which includes a highest speed ratio, if said vehicle is traveling at a relatively low speed, if temperature of hydraulic oil for said transmission is equal to or higher than a predetermined oil temperature, if temperature of cooling water for said engine is equal to or higher than a predetermined water temperature, and if a command to downshift said transmission to a first speed ratio is generated, then said control system creates said neutral condition.

3. The control system as set forth in claim 1, wherein:
said brake operation detector comprises a brake switch that detects pressing of a brake pedal which is provided in said vehicle.

4. The control system as set forth in claim 1, further comprising an inclination sensor which detects said vehicle's inclination in said vehicle's traveling direction, wherein:

if said control system detects by said inclination sensor that said vehicle is on a descending road, then said control system maintains said neutral condition until said brake operation detector detects that said brake operation is terminated, even though said output rotation detector detects that said output member is rotating.

5. The control system as set forth in claim 1, further comprising an inclination sensor which detects said vehicle's inclination in said vehicle's traveling direction, wherein:

if said control system detects by said inclination sensor that said vehicle is on an ascending road whose inclination is equal to or greater than a predetermined inclination, then said control system will not allow said transmission to be set in said neutral condition even though said vehicle whose transmission set in said drive range is stationary with said brake being operated and said accelerator being turned off.

6. The control system as set forth in claim 1, further comprising a first acceleration detector, which detects said vehicle's acceleration in said vehicle's traveling direction on a basis of changes in said vehicle's speed, a second acceleration detector, which detects an acceleration acting on said vehicle based on a value detected by a G sensor, and an inclination detector, which calculates said vehicle's inclination in said vehicle's traveling direction from acceleration values detected by said first and second acceleration detectors, wherein:

if said vehicle's inclination in said traveling direction detected by said inclination detector just before said vehicle has come into a halt indicates that said inclination is equal to or greater than a predetermined upward inclination, then while the vehicle is stationary with the brake being operated and the accelerator being turned off, the control system will not allow said transmission in said drive range to be set in a neutral condition.

7. The control system as set forth in claim 6, wherein:
said G sensor is provided in said vehicle such that while said vehicle is oriented in a horizontal direction, said G sensor detects said vehicle's acceleration in said traveling direction without any effect from gravitational acceleration; and when said vehicle is inclined, said G sensor detects said gravitational acceleration in magnitude which corresponds to the inclination of said vehicle.

8. The control system as set forth in claim 6, wherein:
said inclination detector calculates said vehicle's inclination in said traveling direction from a difference between said acceleration values detected by said first and second acceleration detectors.

9. The control system as set forth in claim 6, further comprising a deceleration detector, which detects said vehicle's deceleration while said vehicle is traveling, wherein:

if said vehicle's deceleration detected by said deceleration detector just before said vehicle has come into a halt is equal to or greater than a predetermined deceleration, then while the vehicle is stationary with the brake being operated and the accelerator being turned off, the control system will not allow said transmission in said drive range to be set in a neutral condition, notwithstanding a value detected by said inclination detector.

* * * * *